United States Patent
Matozaki et al.

(10) Patent No.: US 9,488,829 B2
(45) Date of Patent: Nov. 8, 2016

(54) OPTICAL SCANNING DEVICE AND PROJECTOR

(71) Applicant: MITSUBISHI ELECTRIC CORPORATION, Tokyo (JP)

(72) Inventors: Toshiya Matozaki, Tokyo (JP); Hironori Nakahara, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/440,150

(22) PCT Filed: Sep. 3, 2013

(86) PCT No.: PCT/JP2013/073630
§ 371 (c)(1),
(2) Date: May 1, 2015

(87) PCT Pub. No.: WO2014/097683
PCT Pub. Date: Jun. 26, 2014

(65) Prior Publication Data
US 2015/0293349 A1 Oct. 15, 2015

(30) Foreign Application Priority Data

Dec. 21, 2012 (JP) ................................. 2012-279970

(51) Int. Cl.
*G02B 26/08* (2006.01)
*G02B 26/10* (2006.01)
(Continued)

(52) U.S. Cl.
CPC .............. *G02B 26/101* (2013.01); *G01J 1/42* (2013.01); *G02B 26/105* (2013.01); *G02B 27/01* (2013.01);
(Continued)

(58) Field of Classification Search
CPC ..... G01J 1/42; G02B 26/101; G02B 26/105; G02B 2027/015; G02B 26/0833; G02B 26/0841; G02B 27/0101; G02B 27/01; H04N 9/3135; H04N 9/3194
USPC ....................... 359/196.1–215.1, 220.1–226.2
See application file for complete search history.

(56) References Cited

U.S. PATENT DOCUMENTS 8,908,271 B2 * 12/2014 Goelles ................ G02B 21/008
359/197.1
2001/0021165 A1 9/2001 Nakagishi
(Continued)

FOREIGN PATENT DOCUMENTS

| JP | 11-142772 A | 5/1999 |
|---|---|---|
| JP | 2002-148536 A | 5/2002 |

(Continued)

*Primary Examiner* — James Phan
(74) *Attorney, Agent, or Firm* — Birch, Stewart, Kolasch & Birch, LLP

(57) ABSTRACT

An optical scanning device includes a first scanning driving unit and a second scanning driving unit. The first scanning driving unit includes a scanning mirror and a frame structure supporting the scanning mirror. The first scanning driving unit is configured to cause the scanning mirror to rotate about a first rotation axis by means of deformation of the frame structure. The second scanning driving unit includes a rotation holder supporting the first scanning driving unit and a supporting shaft. The second scanning driving unit is configured to cause the rotation holder to rotate about the second rotation axis. The frame structure includes a pair of beams provided so as to sandwich the scanning mirror in a direction of the first rotation axis, and a pair of base portions provided on sides of respective beams of the pair of beams opposite to the scanning mirror. Each of the pair of base portions has an elongated shape elongated in a direction of the second rotation axis, and is deformable.

5 Claims, 10 Drawing Sheets

(51) Int. Cl.
　　*G02B 27/01*　　(2006.01)
　　*G01J 1/42*　　(2006.01)
　　*H04N 9/31*　　(2006.01)

(52) U.S. Cl.
　　CPC ........ *G02B 27/0101* (2013.01); *H04N 9/3135* (2013.01); *H04N 9/3194* (2013.01); *G02B 2027/015* (2013.01)

(56) References Cited

U.S. PATENT DOCUMENTS

| | | |
|---|---|---|
| 2005/0057790 A1 | 3/2005 | Nomura et al. |
| 2005/0111787 A1 | 5/2005 | Miyajima et al. |
| 2009/0231550 A1 | 9/2009 | Itoh et al. |
| 2010/0149497 A1 | 6/2010 | Drumm et al. |
| 2012/0250306 A1 | 10/2012 | Sugiyama et al. |
| 2012/0300197 A1* | 11/2012 | Richter ................ G02B 26/105 356/138 |

FOREIGN PATENT DOCUMENTS

| | | |
|---|---|---|
| JP | 2002-162595 A | 6/2002 |
| JP | 2005-156976 A | 6/2002 |
| JP | 2005-62358 A | 3/2005 |
| JP | 2009-204804 A | 9/2009 |
| JP | 2010-509624 A | 3/2010 |
| JP | 2010-266508 A | 11/2010 |
| JP | 2011-180462 A | 9/2011 |
| JP | 2011-197485 A | 10/2011 |
| JP | 2012-32678 A | 2/2012 |
| JP | 2012-63656 A | 3/2012 |
| JP | 2012-68424 A | 4/2012 |
| JP | 2012-189662 A | 10/2012 |
| WO | WO 2008/044709 A1 | 4/2008 |
| WO | WO 2010/146974 A1 | 12/2010 |
| WO | WO 2011/074209 A1 | 6/2011 |

* cited by examiner

OPTICAL SCANNING DEVICE AND PROJECTOR

TECHNICAL FIELD

The present invention relates to an optical scanning device used in a projector such as a laser projector.

BACKGROUND ART

In a projector that projects an image on a screen (i.e., a projection surface), an optical scanning device is used for scanning a screen with light (for example, laser light) in a horizontal direction and a vertical direction.

In recent years, an optical scanning device has been developed, in which a scanning mirror and a beam structure are integrally formed using MEMS (Micro Electro Mechanical System) technology.

For example, an optical scanning device disclosed in Patent Document 1 includes a beam structure that supports a scanning mirror so that the scanning mirror is rotatable about beams in two directions perpendicular to each other. By rotating the scanning mirror about the beams in the two directions, the screen is scanned with light in a horizontal direction and a vertical direction.

Further, in the optical scanning device disclosed in Patent Document 1, light is emitted to a back side of the beam structure, and an angle of the scanning mirror is detected by detecting reflected light.

PRIOR ART DOCUMENT

Patent Document

Patent Document 1: Japanese Patent Application Publication No. 2010-266508 (FIG. 4)

DISCLOSURE OF THE INVENTION

Problems to be Solved by the Invention

The beam structure for rotating the scanning mirror is formed using micromachining technology for micro-fabrication of silicon utilizing semiconductor manufacturing technology. Therefore, the beam structure is advantageous in downsizing of the optical scanning device. However, in a configuration in which the scanning mirror rotates in two directions using elastic deformation of the fine beam structure (i.e., torsion of the beam), there is a problem that a range of rotation (angle) of the scanning mirror is limited.

In particular, a laser projector, which is advantageous in downsizing, is assumed to be frequently carried and used at various installation sites. Therefore, it is conceived that the optical scanning device mounted in the laser projector may be applied with an external force such as vibration or shock, or may be subject to a large temperature change.

The fine beam structure is likely to be influenced by vibration or shock. In order to enhance a resistance of the beam structure, it is necessary to increase a size of the beam. Alternatively, it is necessary to employ a composite beam structure for dispersing a stress. However, in either case, there is a problem that the range of rotation of the scanning mirror is further limited.

When the optical scanning device is subjected to a temperature change, a deformation amount of the beam structure (i.e., an amount of torsion of the beams) is likely to change. Therefore, the temperature change affects a rotation angle of the scanning mirror. In addition, since expensive equipment or apparatuses are used in the above described micromachining technology, the optical scanning device using MEMS has a problem of high manufacturing cost.

The present invention is intended to solve the above described problems, and an object of the present invention is to provide an optical scanning device and a projector which are less likely to be influenced by an external force such as vibration or shock and a temperature change, and which are capable of stable scanning.

Means of Solving the Problems

In order to achieve the above described object, the optical scanning device of the present invention includes a first scanning driving unit including a scanning mirror, and a frame structure supporting the scanning mirror, the first scanning driving unit being configured to cause the scanning mirror to rotate about a first rotation axis by means of deformation of the frame structure, and a second scanning driving unit including a rotation holder supporting the first scanning driving unit, and a supporting shaft that supports the rotation holder so that the rotation holder is rotatable about a second rotation axis perpendicular to the first rotation axis, the second scanning driving unit being configured to cause the rotation holder to rotate about the second rotation axis. The frame structure includes a pair of beams provided so as to sandwich the scanning mirror in a direction of the first rotation axis, and a pair of base portions provided on sides of respective beams of the pair of beams opposite to the scanning mirror. Each of the pair of base portions has an elongated shape elongated in a direction of the second rotation axis, and is deformable.

Further, the projector of the present invention includes the above described optical scanning device.

Effect of the Invention

The optical scanning device of the present invention is less likely to be influenced by an external force such as vibration or shock and a temperature change, and is capable of stable scanning. Further, it is not necessary to use MEMS technology, and therefore a manufacturing cost can be reduced.

MODE FOR CARRYING OUT THE INVENTION

Embodiment 1

Configuration of Optical Scanning Device

Figure 1:
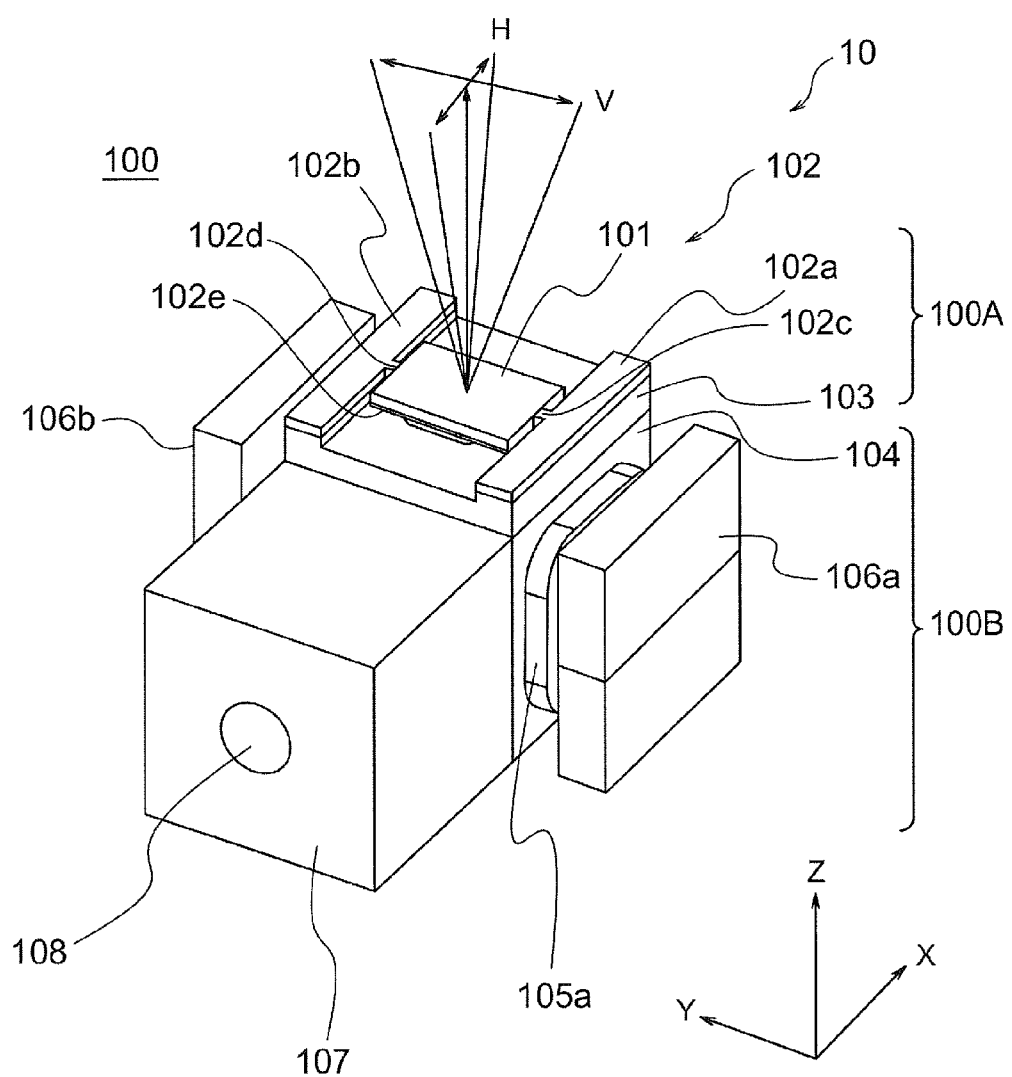
FIG. 1 is a perspective view showing a main part of an optical scanning device according to Embodiment 1 of the present invention.
Figure 2:
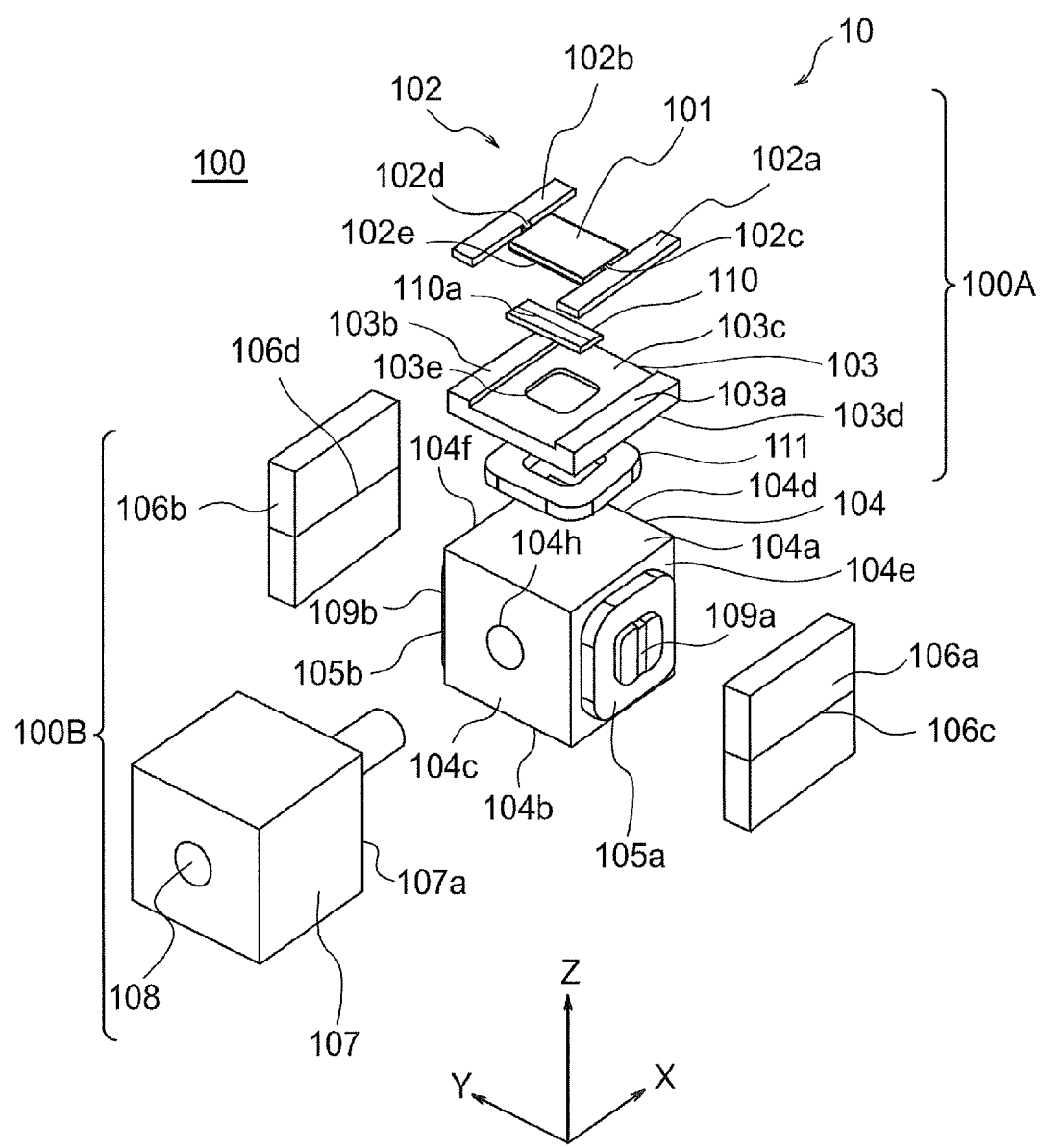
FIG. 2 is an exploded perspective view showing the main part of the optical scanning device according to Embodiment 1 of the present invention.

FIGS. 1 and 2 are respectively a perspective view and an exploded perspective view showing a configuration of a main part of an optical scanning device 10 (i.e., a two-dimensional optical scanning device) according to Embodiment 1 of the present invention. The optical scanning device 10 is used in, for example, a laser projector or the like. Further, the optical scanning device 10 is configured to perform scanning at a high speed using light (i.e., laser light in this case) emitted by a light source.

The optical scanning device 10 includes a horizontal scanning driving unit 100A (i.e., a first scanning driving unit), and a vertical scanning driving unit 100B (i.e., a second scanning driving unit). The horizontal scanning driving unit 100A scans a screen with laser light in a horizontal direction (i.e., an H direction) of the screen. The vertical scanning driving unit 100B scans the screen with the laser light in a vertical direction (i.e., a V direction) of the screen.

Figure 6:
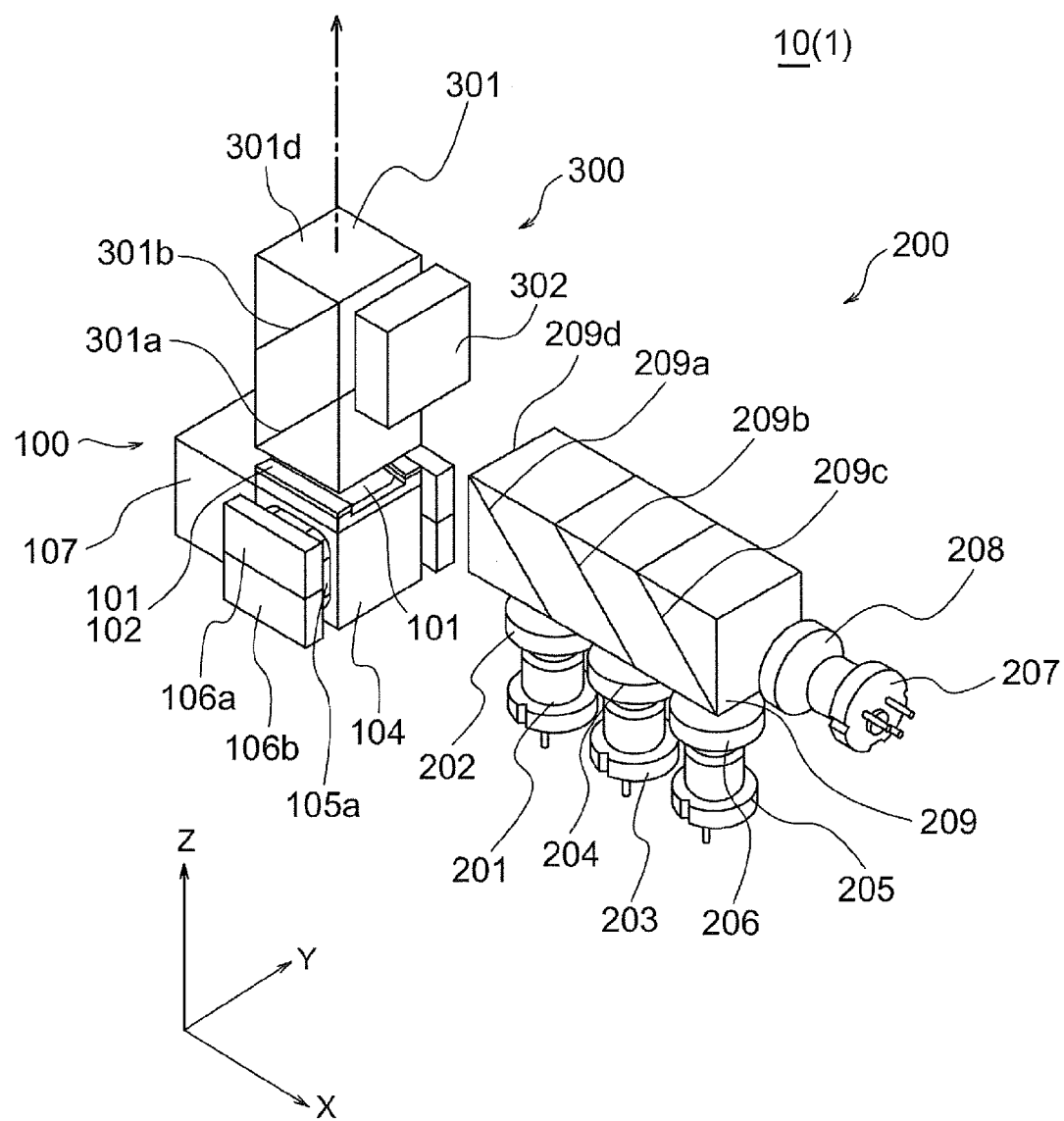
FIG. 6 is a perspective view showing an entire configuration of the optical scanning device according to Embodiment 1 of the present invention.

To be more specific, the horizontal scanning driving unit 100A includes a scanning mirror 101 that reflects the laser light emitted by a light source unit 200 (FIG. 6). The horizontal scanning driving unit 100A scans the screen in the horizontal direction with the laser light by causing the scanning mirror 101 to rotate about an axis in a Y direction (i.e., a first rotation axis).

Further, the vertical scanning driving unit 100B scans the screen in the vertical direction with the laser light by causing a rotation body including the horizontal scanning driving unit 100A to rotate about an axis in an X direction (i.e., a second rotation axis).

In respective drawings, the X direction and the Y direction are two directions perpendicular to each other. Further, a Z direction is defined as a direction perpendicular to an XY plane including the X direction and the Y direction. The X direction, the Y direction and the Z direction are defined for convenience of explanation only, and do not limit an orientation of the optical scanning device 10 when the optical scanning device 10 is used.

The horizontal scanning driving unit 100A and the vertical scanning driving unit 100B constitute a two-dimensional optical scanning unit 100 that causes the scanning mirror 101 to rotate in two directions about the rotation axes in the X direction and the Y direction.

Hereinafter, respective configurations of the horizontal scanning driving unit 100A and the vertical scanning driving unit 100B will be described with reference to FIGS. 1 and 2.

<Configuration of Horizontal Scanning Driving Unit>

In FIG. 2, the horizontal scanning driving unit 100A includes a scanning mirror 101, a frame structure (i.e., a beam structure) 102, a supporting body 103, a horizontal scanning magnet (i.e., a first magnet) 110, and a horizontal scanning coil (i.e., a first coil) 111. The frame structure 102 is configured to support the scanning mirror 101 as will be described later.

For example, the scanning mirror 101 has a surface (i.e., a reflecting surface) of a rectangular shape including two sides in the X direction and two sides in the Y direction. For example, the scanning mirror 101 is a thin plate-like member or a coating layer. For example, long sides (in this case, the sides in the Y direction) of the scanning mirror 101 are approximately 1.5 mm in length. In this regard, a description such as "including two sides in the X direction and two sides in the Y direction" is made under an assumption that the scanning mirror 101 is in a reference position in a range of rotation.

The frame structure 102 is configured to rotatably support the scanning mirror 101. For example, the frame structure 102 is formed by a machined-and-shaped metal article or a molded resin article. More specifically, the frame structure 102 is composed of silicon or bulk amorphous alloy, or a composite of the above described metal material and thermoplastic resin or ultraviolet curable resin.

The frame structure 102 includes base portions 102a and 102b which are a pair of elongated members extending in the X direction. The base portions 102a and 102b face each other in the Y direction. Beams 102c and 102d are formed at respective centers of the base portions 102a and 102b in the X direction, and protrude in the Y direction. The beams 102c and 102d are located on the same axis line in the Y direction. A seat 102e is formed between the beams 102c and 102d.

The seat 102e is a plate-like portion having a rectangular shape including two sides in the X direction and two sides in the Y direction. The scanning mirror 101, which is a thin plate-like member, is fixed to a surface of the seat 102e. Further, the scanning mirror 101 may be formed by coating a reflective layer on the surface of the seat 102e. Hereinafter, the term "scanning mirror 101" is used to include the scanning mirror 101 and the seat 102e.

In other words, the frame structure 102 includes a pair of beams 102c and 102d provided so as to sandwich the scanning mirror 101 in the Y direction (i.e., in the direction of the first rotation axis), and a pair of base portions 102a and 102b provided on respective sides of the beams 102c and 102d opposite to the scanning mirror 101. The base portions 102a and 102b each have an elongated shapes elongated in the X direction (i.e., in the direction of the second rotation axis), and are configured to be deformable.

As shown in FIG. 2, the supporting body 103 is a block having an upper surface 103c and a lower surface 103d parallel to the XY plane, and having a thickness in the Z direction. Convex portions 103a and 103b in the form of rails are formed on both ends of the upper surface 103c of the supporting body 103 in the Y direction. The convex portions 103a and 103b protrude upward (i.e., in +Z direction). The convex portions 103a and 103b both extend in the X direction. The base portions 102a and 102b of the frame structure 102 are respectively fixed to upper surfaces of the convex portions 103a and 103b.

A predetermined space is formed between a back surface (i.e., a surface facing in the −Z direction) of the scanning mirror 101 and the upper surface 103c of the supporting body 103, in a state where the frame structure 102 is mounted to the convex portions 103a and 103b of the supporting body 103. This space allows a rotation of the scanning mirror 101.

Further, the horizontal scanning magnet 110 is provided on the back surface of the scanning mirror 101. The horizontal scanning magnet 110 is, for example, a thin magnet layer. The horizontal scanning magnet 110 has an elongated shape elongated in the Y direction. The horizontal scanning magnet 110 is located on the axis line in the Y direction connecting the beams 102c and 102d. The horizontal scanning magnet 110 may be fixed to the back surface of the scanning mirror 101, or may be formed by coating a magnetic material on the back surface of the scanning mirror 101.

The horizontal scanning magnet 110 is bipolar-magnetized symmetrically with respect to the axis line 110a in the Y direction connecting the beams 102c and 102d. That is, the horizontal scanning magnet 110 is magnetized so that a +X side of the horizontal scanning magnet 110 becomes an N-pole (or an S-pole), and a −X side of the horizontal scanning magnet 110 becomes an S-pole (or an N-pole), with respect to the axis line 110a in the Y direction connecting the beams 102c and 102d.

The horizontal scanning coil 111 is fixed to the lower surface 103d of the supporting body 103. The horizontal scanning coil 111 is disposed so as to face the horizontal scanning magnet 110 via the supporting body 103. The horizontal scanning coil 111 is wound around a winding axis in the Z direction, and wound in a substantially rectangular shape so as to have coil portions extending in the X direction and coil portions extending in the Y direction.

Further, an opening 103e is formed at a center of the supporting body 103. The opening 103e is provided for allowing a magnetic field formed by the above described horizontal scanning magnet 110 to reach the horizontal scanning coil 111. In this regard, the horizontal scanning coil 111 is formed of, for example, a copper wire. Further, it is also possible to form the horizontal scanning coil 111 by an aluminum wire to thereby reduce a weight of the horizontal scanning coil 111.

In the horizontal scanning driving unit 100A configured as above, torsion-deformation of the beams 102c and 102d of the frame structure 102 allows a vibration body including the scanning mirror 101, the frame structure 102 and the horizontal scanning magnet 110 to rotate about a rotation axis in the Y direction connecting the beams 102c and 102d.

For example, the scanning driving frequency of a laser projector 1 in the horizontal direction is in a range from several kHz to several tens kHz. Therefore, the scanning mirror 101 is required to rotate at a high speed. Therefore, the vibration body including the scanning mirror 101, the frame structure 102 and the horizontal scanning magnet 110 is formed to minimize a moment of inertia about the rotation axis in te Y direction connecting the beams 102c and 102d and to have durability required for the rotation of the scanning mirror 101.

Further, in this embodiment, the vibration body including the scanning mirror 101, the frame structure 102 and the horizontal scanning magnet 110 is formed so that resonance of the vibration body is excited at the horizontal-direction-scanning driving frequency. This will be described later.

<Configuration of Vertical Scanning Driving Unit>

The vertical scanning driving unit 100B includes a rotation holder 104, vertical scanning coils 105a and 105b (i.e., a second coil), vertical scanning magnets 106a and 106b (i.e., a second magnet), a base 107, a supporting shaft 108, and magnetic pieces 109a and 109b. The above described horizontal scanning driving unit 100A is mounted on the rotation holder 104.

The rotation holder 104 has a hexahedral shape (i.e., a rectangular parallelepiped shape) including two surfaces 104a and 104b parallel to the XY plane, two surfaces 104c and 104d parallel to a YZ plane, and two surfaces 104e and 104f parallel to an XZ plane. A description such as "parallel to the XY plane" is made under an assumption that the rotation holder 104 is in a reference position in a range of rotation. The rotation holder 104 is formed of a molded resin article such as engineering plastic having high rigidity and excellent sliding property.

The above described horizontal scanning driving unit 100A is fixed to the upper surface 104a of the rotation holder 104. To be more specific, the horizontal scanning coil 111 fixed to the lower surface of the supporting body 103 of the horizontal scanning driving unit 100A is fixed to the upper surface 104a of the rotation holder 104.

Further, a shaft receiving portion 104h opens in the surface 104c of the rotation holder 104 parallel to the YZ plane. The shaft receiving portion 104h is a hole having a cylindrical shape formed inside the rotation holder 104 in the X direction. Here, a distal end of the shaft receiving portion 104h (see FIG. 3) reaches a vicinity of the opposite surface 104d of the rotation holder 104.

The supporting shaft 108 mounted to the base 107 fits into the shaft receiving portion 104h of the rotation holder 104. The supporting shaft 108 has a cylindrical shape whose axial direction is the X direction. The supporting shaft 108 and the shaft receiving portion 104h engage each other, and the rotation holder 104 is supported so as to be rotatable about a rotation axis in the X direction.

For example, the supporting shaft 108 is formed of a stainless steel shaft subjected to centerless machining. The tip of the supporting shaft 108 abuts against an inner surface of the shaft receiving portion 104h of the rotation holder 104 (see FIG. 3). Further, a periphery of the tip of the supporting shaft 108 is machined to have a curved surface (i.e., is rounded). Further, it is also possible to form shallow grooves in a circumferential direction on the supporting shaft 108 in advance, and to mold the supporting shaft 108 integrally with the rotation holder 104. In this way, a higher fitting accuracy can be obtained.

The base 107 supporting the supporting shaft 108 is fixed to a casing of the optical scanning device 10. For example, the base 107 has a hexahedral shape (i.e., a rectangular parallelepiped shape). The base 107 has a surface 107a parallel to the YZ plane. This surface 107a contacts the surface 104c of the rotation holder 104.

The vertical scanning coils 105a and 105b are fixed to two surfaces 104e and 104f of the rotation holder 104 parallel to the XZ plane. The vertical scanning coils 105a and 105b are wound around winding axes in the Y direction, and wound in a substantially rectangular shape to have coil portions in the X direction and coil portions in the Z direction. The vertical scanning coils 105a and 105b are formed of, for example, copper wires. Alternatively, it is also possible to form the vertical scanning coils 105a and 105b by aluminum wires to thereby reduce weights of the vertical scanning coils 105a and 105b.

The vertical scanning magnet 106a is provided so as to face the vertical scanning coil 105a in the Y direction. The vertical scanning magnet 106a has a boundary 106c at a position facing a center of the rotation holder 104 in the Z direction, and is bipolar-magnetized in the Z direction (i.e., vertically). For example, an upper side (i.e., a +Z direction side) of the boundary 106c is magnetized so that a surface facing the rotation holder 104 becomes an S-pole and an opposite surface become an N-pole. A lower side (i.e., a −Z direction side) of the boundary 106c is magnetized so that a surface facing the rotation holder 104 becomes an N-pole and an opposite surface becomes an S-pole. In this regard, a magnetizing direction of the vertical scanning magnet 106a may be opposite to that described above.

The vertical scanning magnet 106b is disposed so as to face the vertical scanning coil 105b in the Y direction. The vertical scanning magnet 106b has a boundary 106d at a position facing a center of the rotation holder 104 in the Z direction, and is bipolar-magnetized in the Z direction (vertically). For example, an upper side (i.e., a +Z direction side) of the boundary 106d is magnetized so that a surface facing the rotation holder 104 becomes an N-pole and an opposite surface becomes an S-pole. A lower side (i.e., a −Z direction side) of the boundary 106d is magnetized so that a surface facing the rotation holder 104 becomes an S-pole and an opposite surface becomes an N-pole. In this regard, a magnetizing direction of the vertical scanning magnet 106b may be opposite to that described above.

With such an arrangement, it is possible to maximize effective coil lengths of the vertical scanning coils 105a and 105b that contribute to generation of a driving force. Therefore, it is possible to reduce a moment of inertia of the rotation body (i.e., the horizontal scanning driving unit 100A, the rotation holder 104, the vertical scanning coils 105a and 105b, and the magnetic pieces 109a and 109b) about the supporting shaft 108. That is, an excellent rotation performance can be achieved with smaller power consumption.

Figure 5:
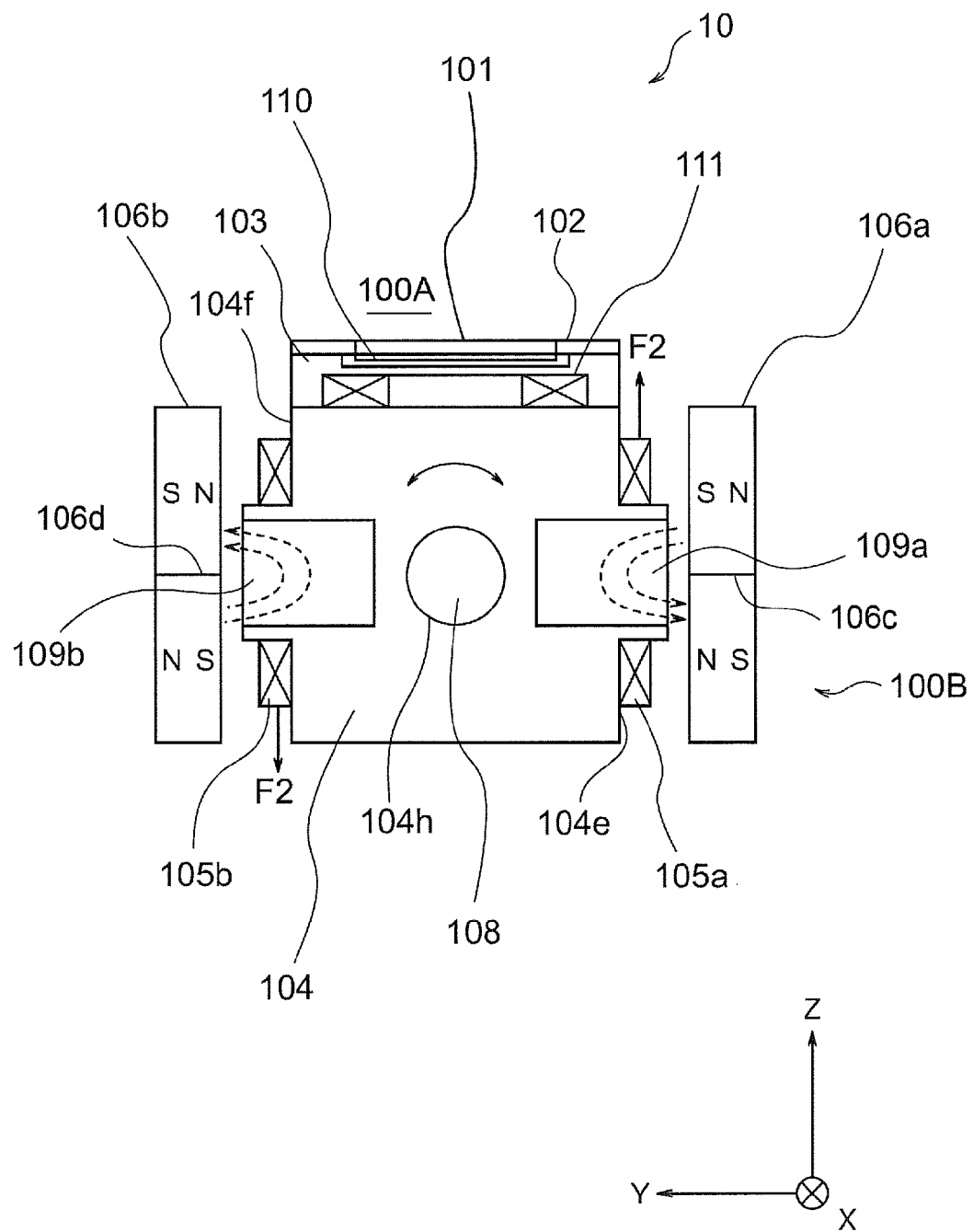
FIG. 5 is a sectional view showing an operation of a vertical scanning driving unit according to Embodiment 1 of the present invention.

The magnetic piece 109a is formed on the surface 104e of the rotation holder 104, and is located inside the vertical scanning coil 105a. The magnetic piece 109a is located at a center of the surface 104e of the rotation holder 104 in the X direction. Further, as shown in FIG. 5 described later, the magnetic piece 109a is a plate-like member having a surface parallel to the YZ plane. An end surface of the magnetic piece 109a in −Y direction (i.e., a surface elongated in the Z direction) faces the vertical scanning magnet 106a.

Similarly, the magnetic piece 109b is formed on the surface 104f of the rotation holder 104, and is located inside the vertical scanning coil 105b. The magnetic piece 109b is located at a center of the surface 104f of the rotation holder 104 in the X direction. Further, as shown in FIG. 5 described later, the magnetic piece 109b is a plate-like member having a surface parallel to the YZ plane. An end surface of the magnetic piece 109b in +Y direction (i.e., a surface elongated in the Z direction) faces the vertical scanning magnet 106b.

<Operation of Horizontal Scanning Driving Unit 100A>

Figure 3:
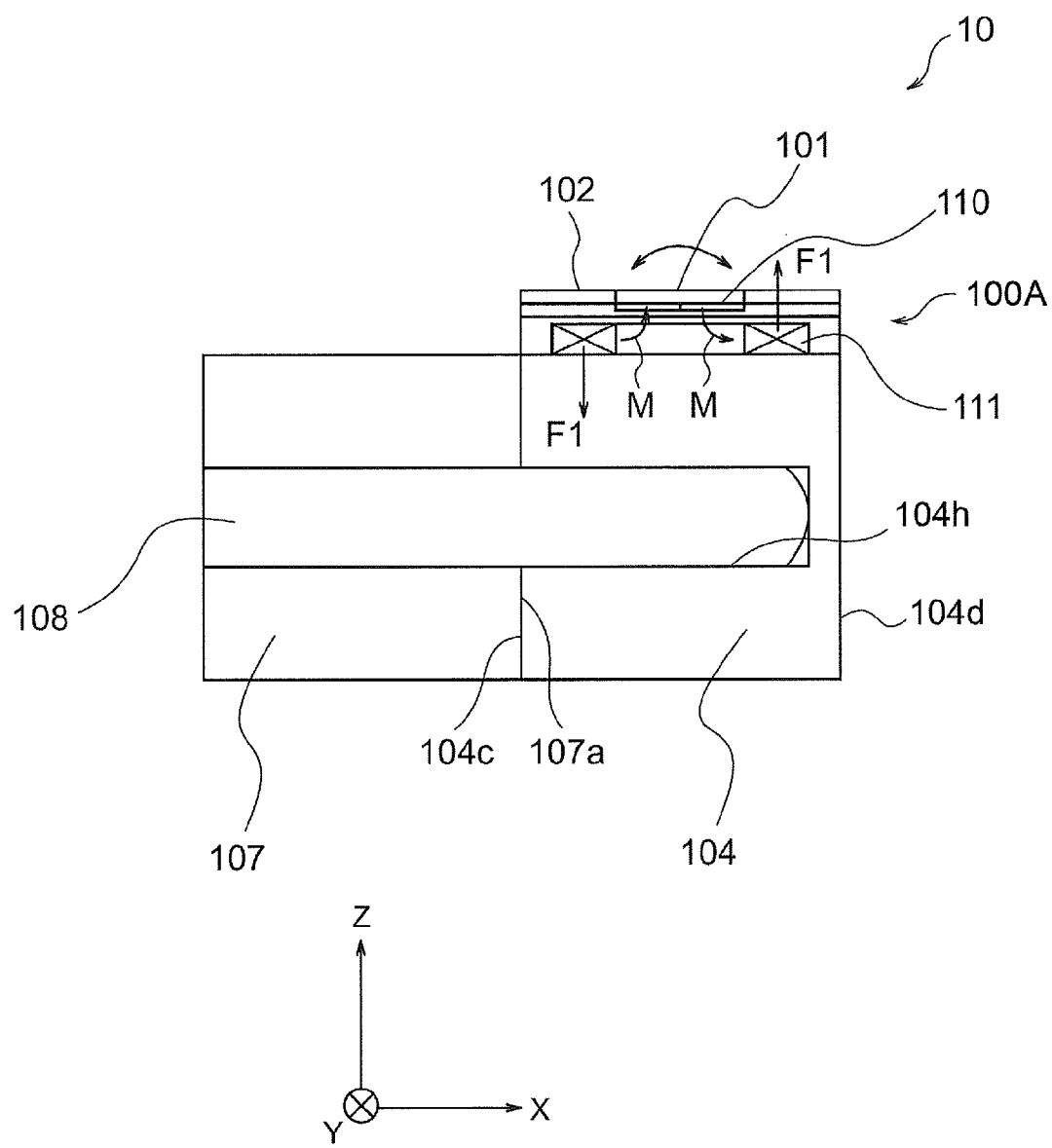
FIG. 3 is a sectional view showing an operation of a horizontal scanning driving unit according to Embodiment 1 of the present invention.

Next, an operation of the horizontal scanning driving unit 100A of the optical scanning device 10 will be described with reference to FIGS. 2 and 3. FIG. 3 is a sectional view schematically showing the operation of the horizontal scanning driving unit 100A of the optical scanning device 10.

When the horizontal scanning driving unit 100A, is driven a predetermined driving current (referred to as a "horizontal-direction-scanning driving current") is supplied to the above described horizontal scanning coil 111. The horizontal-direction-scanning driving current is a sine-waveform current having a predetermined frequency (referred to as a "horizontal-direction-scanning driving frequency").

When the scanning driving current flows through the horizontal scanning coil 111, an electromagnetic force F1 in +Z direction and an electromagnetic force F1 in −Z direction are generated by interaction between the current flowing through a pair of the coil portions in the Y direction and a magnetic field M (FIG. 3) generated by the horizontal scanning magnet 110. That is, a driving force is generated, which causes the vibration body (i.e., the scanning mirror 101, the frame structure 102 and the horizontal scanning magnet 110) to which the horizontal scanning magnet 110 is fixed to rotate about the rotation axis in the Y direction, with respect to the rotation holder 104 with the horizontal scanning coil 111 fixed thereto.

The current flowing through the horizontal scanning coil 111 is an alternating current (i.e., the sine-waveform current having the horizontal-direction-scanning driving frequency), and therefore the vibration body including the scanning mirror 101 rotates about the rotation shaft (i.e., the beams 102c and 102d) in the Y direction at a high speed, i.e., the horizontal-direction-scanning driving frequency.

The vibration body including the scanning mirror 101, the frame structure 102 and the horizontal scanning magnet 110 is configured so that resonance of the vibration body is excited at the above described horizontal-direction-scanning driving frequency. In other words, the vibration body including the scanning mirror 101, the frame structure 102 and the horizontal scanning magnet 110 has a natural vibration mode at the above described horizontal-direction-scanning driving frequency. Therefore, the scanning mirror 101 rotates at the horizontal-direction-scanning driving frequency even when the current flowing through the horizontal scanning coil 111 is small.

This vibration property is determined based on a moment of inertia of the frame structure 102 about the beams 102c and 102d, mechanical properties (i.e., an elastic coefficient, a second moment of area, and a length) of the beams 102c and 102d supporting the scanning mirror 101, and a mounting position of the frame structure 102.

FIGS. 4(a) through 4(d) are schematic views showing vibration states of the vibration body including the scanning mirror 101, the frame structure 102 and the horizontal scanning magnet 110. In FIGS. 4(a) through 4(d), the horizontal scanning magnet 110 is omitted.

Figure 4:
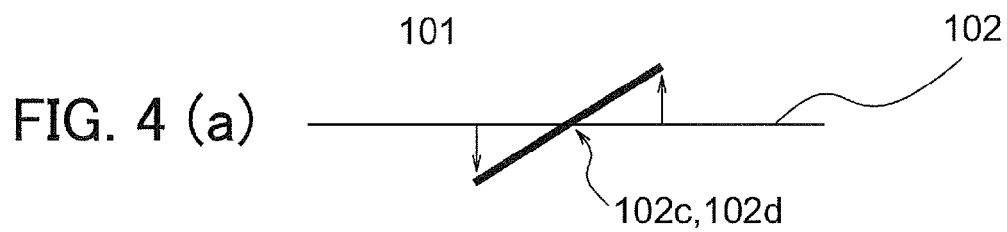
FIGS. 4(a), 4(b), 4(c) and 4(d) are schematic views showing an operation of a frame structure of the horizontal scanning driving unit according to Embodiment 1 of the present invention.
Figure 4:
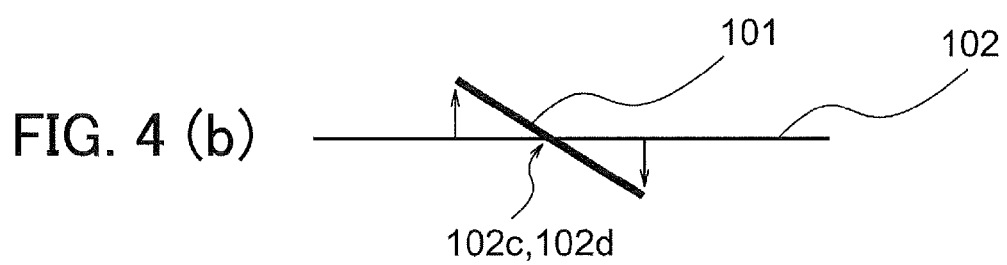
Figure 4:
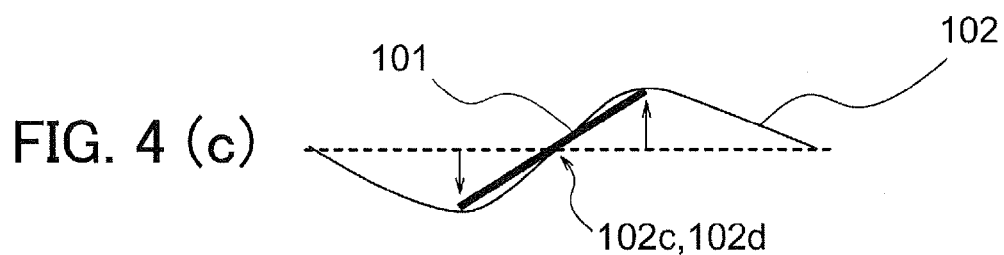
Figure 4:
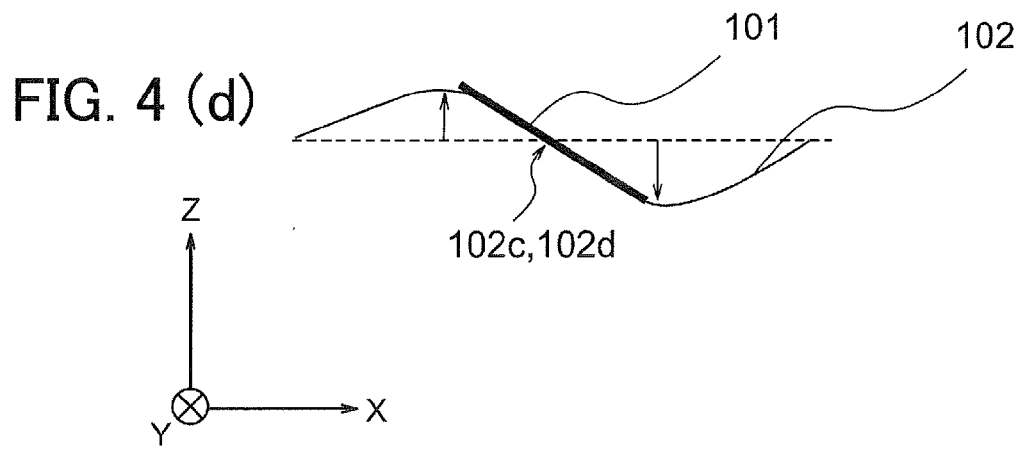

FIGS. 4(a) and 4(b) show vibration states in the case where the frame structure 102 is configured so that the thin beams 102c and 102d are easily torsion-deformed. FIGS. 4(c) and 4(d) show vibration states in the case where resonance of the base portions 102a and 102b (FIG. 2) of the frame structure 102 is generated in such a manner that the base portions 102a and 102b are deformed in S-shape a about nodes on both ends in the longitudinal direction being nodes.

In a reference example shown in FIGS. 4(a) and 4(b), torsion amounts of the thin beams 102c and 102d are large. Therefore, depending on material from which the beams 102c and 102d are formed, a rotation amplitude and a driving frequency cannot be sufficiently increased.

In contrast, according to this embodiment, the beams 102c and 102d are formed integrally with the base portions 102a and 102b elongated in the X direction, and the base portions 102a and 102b are deformed in S-shape as shown in FIGS. 4(c) and 4(d) at the above described horizontal-direction-scanning driving frequency. In other words, resonance of the base portions 102a and 102b of the frame structure 102 is generated in such a manner that the base portions 102a and 102b are deformed with their both ends in the longitudinal direction being nodes. Therefore, the torsion amounts of the beams 102c and 102d can be made small, and widths of the beams 102c and 102d can be made larger correspondingly. As a result, selection of material of the beams 102c and 102d can be widened. Further, resistance of the beams 102c and 102d to vibration or shock can be enhanced.

<Operation of Vertical Scanning Driving Unit 100B>

Next, the operation of the vertical scanning driving unit 100B of the optical scanning device 10 will be described with reference to FIG. 5. FIG. 5 is a sectional view schematically showing the operation of the vertical scanning driving unit 100B of the optical scanning device 10.

In FIG. 5, the magnetic pieces 109a and 109b provided in the rotation holder 104 face approximately center positions of the vertical scanning magnets 106a and 106b. When plate surfaces of the magnetic pieces 109a and 109b are parallel to the YZ plane, the plate surfaces of the magnetic pieces 109a and 109b are parallel to flows of magnetic fluxes of the vertical scanning magnets 106a and 106b. In this position, attraction forces between the magnetic pieces 109a and 109b and the vertical scanning magnets 106a and 106b become the largest. Therefore, the rotation holder 104 is stably held. That is, the magnetic pieces 109a and 109b interact with the vertical scanning magnets 106a and 106b to provide a function to keep the rotation holder 104 at a reference position in a rotating direction about the rotation axis in the X direction.

When the rotation holder 104 rotates about the rotation axis in the X direction from the reference position, the attraction forces between the magnetic pieces 109a and 109b and the vertical scanning magnets 106a and 106b generate a restoring force urging the rotation holder 104 to return to the reference position. That is, the magnetic pieces 109a and 109b provide a stable magnetic spring force in the rotating direction. Further, the magnetic spring force has properties such that the magnetic spring force is less likely to change with a temperature change.

When the vertical scanning driving unit 100B, a predetermined driving current (referred to as a "vertical-direction-scanning driving current") is supplied to the above described vertical scanning coils 105a and 105b. The vertical-direction-scanning driving current is a sine-waveform current having a predetermined frequency (referred to as a "vertical-direction-scanning driving frequency").

When the scanning driving current flows through the vertical scanning coil 105a, an electromagnetic force F2 is generated in +Z direction (or −Z direction) by interaction between a current flowing through coil portions of the vertical scanning coil 105a in the X direction and a magnetic field generated by the vertical scanning magnet 106a. When the scanning driving current flows through the vertical scanning coil 105b, an electromagnetic force F2 is generated in −Z direction (or +Z direction) by interaction between a current flowing through coil portions of the vertical scanning coil 105b in the X direction and a magnetic field generated by the vertical scanning magnet 106b.

Therefore, a driving force is generated, which causes a rotation body (i.e., the horizontal scanning driving unit 100A, the rotation holder 104, the vertical scanning coils 105a and 105b and the magnetic pieces 109a and 109b) to which the vertical scanning coils 105a and 105b are mounted to rotate about a rotation axis (i.e., a supporting shaft 108) in the X direction.

The current flowing through the vertical scanning coils 105a and 105b is an alternating current (i.e., a sine-waveform current having the vertical-direction-scanning driving frequency), and therefore the rotation body to which the vertical scanning coils 105a and 105b are mounted rotate about the supporting shaft 108 at a high speed, i.e., at the vertical-direction-scanning driving frequency.

Resonance of the rotation body including the horizontal scanning driving unit 100A, the rotation holder 104, the vertical scanning coils 105a and 105b and the magnetic pieces 109a and 109b is excited at a resonant frequency equal to the above described vertical-direction-scanning driving frequency. Therefore, the scanning mirror 101 rotates at the above described vertical-direction-scanning driving frequency, even when the current flowing through the vertical scanning coils 105a and 105b is small.

In this regard, the frequency at which the resonance of the rotation body is excited is determined by a moment of rotation of the rotation body (i.e., the horizontal scanning driving unit 100A, the rotation holder 104, the vertical scanning coil 105a and 105b, the magnetic pieces 109a and 109b) about the supporting shaft 108 and the magnetic spring force generated by the vertical scanning magnets 106a and 106b and the magnetic pieces 109a and 109b.

Here, a position where the attraction forces between the magnetic pieces 109a and 109b and the vertical scanning magnets 106a and 106b become the largest is determined as the reference position of the rotation body including the rotation holder 104 in the rotating direction. Therefore, a repeatability of the reference position (accuracy in a starting point) is high.

In this regard, the magnetic pieces 109a and 109b and the vertical scanning magnets 106a and 106b may be configured to bias the rotation holder 104 in −X direction so that a tip of the supporting shaft 108 and the shaft receiving portion 104h of the rotation holder 104 constantly contact each other. Further, a contact area between the tip of the supporting shaft 108 and the shaft receiving portion 104h of the rotation holder 104 may be reduced so as to allow the rotation holder 104 to smoothly rotate.

In this embodiment, the horizontal-direction-scanning driving frequency (i.e., a main scanning direction) is higher than the vertical-direction-scanning driving frequency (i.e., a sub scanning direction).

For example, if a resolution is 640×480, the horizontal-direction-scanning driving frequency is 18 kHz, and the vertical-direction-scanning driving frequency is 60 Hz. If the resolution is 800×600, the horizontal-direction-scanning driving frequency is 22.5 kHz, and the vertical-direction-scanning driving frequency is 60 Hz. If the resolution is 1024×768, the horizontal-direction-scanning driving frequency is 28.8 kHz, and the vertical-direction-scanning driving frequency is 60 Hz.

In this way, in the optical scanning device 10 of this embodiment, the horizontal scanning driving unit 100A performs scanning in the horizontal direction by rotating the scanning mirror 101 using deformation of the frame structure 102. Further, the vertical scanning driving unit 100B performs scanning in the vertical direction by rotating the rotation body including horizontal scanning driving unit 100A about the supporting shaft 108. Therefore, it is possible to stably perform optical scanning without being influenced by an external force such as vibration or shock, and a temperature change.

<Entire Configuration and Optical System of Optical Scanning Device>

Figure 7:
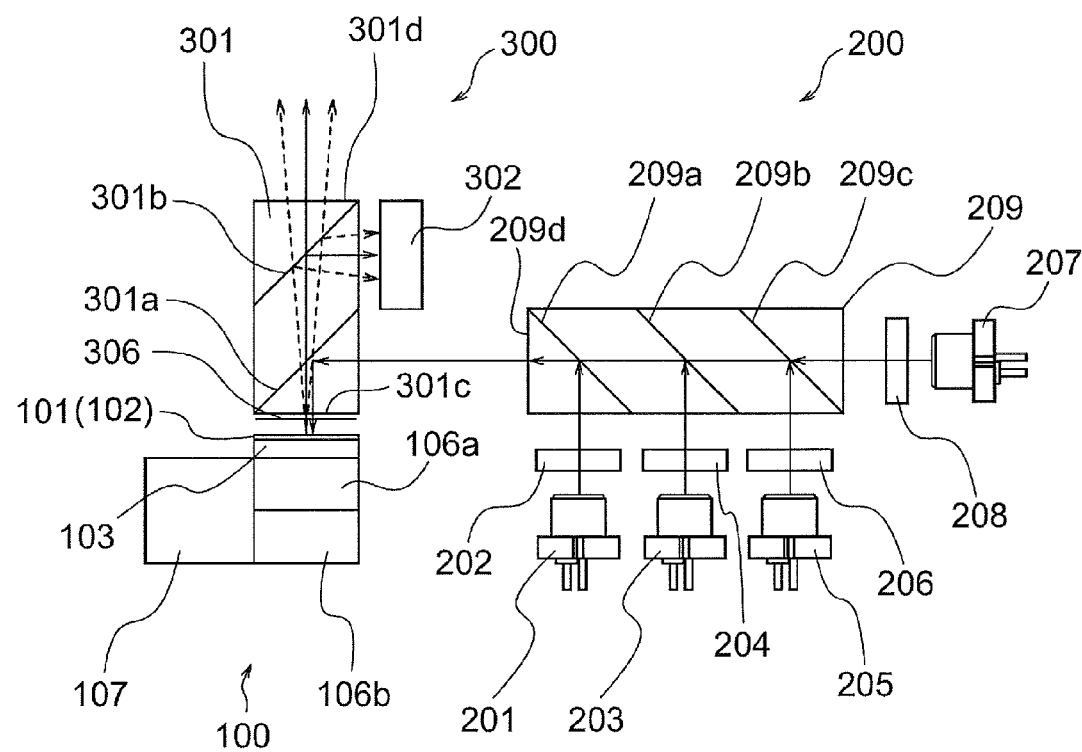
FIG. 7 is a front view showing the entire configuration and an optical path of the optical scanning device according to Embodiment 1 of the present invention.

FIGS. 6 and 7 are a perspective view and a front view showing an entire configuration and an optical path of the optical scanning device 10 according to this embodiment. The optical scanning device 10 shown in FIGS. 6 and 7 constitute the laser projector 1.

As shown in FIGS. 6 and 7, the optical scanning device 10 includes a two-dimensional optical scanning unit 100 (i.e., the horizontal scanning driving unit 100A and the vertical scanning driving unit 100B), a light source unit 200 and an emission-side optical system 300.

The light source unit 200 includes semiconductor lasers 201, 203 and 205 (i.e., display light sources) that emit blue light, green light and red light, a semiconductor laser 207 (i.e., a sensing light source) that emits infrared light of an invisible wavelength. Here, the semiconductor lasers 201, 203, 205 and 207 are arranged in the X direction. The semiconductor lasers 201, 203 and 205 are arranged so that emission optical axes are directed in the Z direction. The semiconductor laser 207 is arranged so that an emission optical axis is directed in the X direction.

Collimator lenses 202, 204 and 206 are provided on emission-sides of the semiconductor lasers 201, 203 and 205 for converting laser light emitted by the semiconductor lasers 201, 203 and 205 into parallel light. A collimator lens 208 is provided on an emission-side of the semiconductor laser 207 for converting laser light emitted by the semiconductor laser 207 into parallel light.

Further, a prism (i.e., an incident-side optical element) 209 is disposed where the laser light emitted from the collimator lenses 202, 204 and 206 and the collimator lens 208 is incident. The prism 209 combines the laser light, and emits the laser light along a common optical path.

The prism 209 has prism surfaces 209a, 209b and 209c that reflect the laser light incident from the semiconductor lasers 201, 203 and 205 (i.e., the collimator lenses 202, 204 and 206) respectively in −X direction. The prism surface 209a reflects the laser light (i.e., the blue light) from the semiconductor laser 201, and transmits the laser light (i.e., the green light, the red light and the infrared light) from the semiconductor lasers 203, 205 and 207. The prism surface 209b reflects the laser light (i.e., the green light) from the semiconductor laser 203, and transmits the laser light (i.e., the red light and the infrared light) from the semiconductor lasers 205 and 207. The prism surface 209c reflects the laser light (i.e., the red light) from the semiconductor laser 205, and transmits the laser light (i.e., the infrared light) from the semiconductor laser 207.

Further, the prism 209 has an emission surface 209d through which the laser light combined in the prism 209 (i.e., the laser light obtained by combining the blue light, the green light, the red light and the infrared light) is emitted.

A prism (i.e., an emission-side optical element) 301 is disposed where the laser light emitted from the emission surface 209d of the prism 209 is incident. The prism 301 has a prism surface 301a that reflects the laser light incident from the prism 209 downward (i.e., in −Z direction) toward a reflection surface of the scanning mirror 101.

The prism 301 also has and an incident/emission surface 301c (FIG. 7) through which the laser light reflected by the prism surface 301a of the prism 301 is emitted toward the scanning mirror 101. A ¼ wavelength plate 306 (FIG. 7) is provided between the incident/emission surface 301c and the scanning mirror 101.

The laser light emitted from the incident/emission surface 301c of the prism 301 and incident on the scanning mirror 101 via the ¼ wavelength plate 306 is reflected by the scanning mirror 101. The laser light reflected by the scanning mirror 101 is incident on the prism 301 via the ¼ wavelength plate 306 again, passes through the prism surface 301a, and proceeds upward (in +Z direction).

In the prism 301, a prism surface 301b is formed above (i.e., +Z direction) the prism surface 301a. Among the laser light having passed through the prism surface 301a, the prism surface 301b reflects only the infrared light by approximately 90 degrees.

A photodetector 302 as an optical detector is provided at a position on which the laser light (i.e., the infrared light) reflected by the prism surface 301b of the prism 301 is incident. In this regard, the photodetector 302 is provided for detecting angle information of the scanning mirror 101 in the horizontal direction and the vertical direction.

An emission surface 301d is formed on an upper surface of the prism 301. The light having passed through the prism surface 301b is emitted outside the prism 301 through the emission surface 301d. The prism 301 and the photodetector 302 constitute the emission-side optical system 300.

<Operation of Optical Scanning Device>

The laser light (i.e., the blue light, the green light and the red light) emitted by the semiconductor lasers 201, 203 and 205, and the laser light (i.e., the infrared light) emitted by the semiconductor laser 207 respectively pass through the collimator lenses 202, 204, 206 and 208 to become parallel light, and are incident on the prism 301. The laser light (i.e., the blue light) from the semiconductor laser 201 is reflected by the prism surface 209a, and proceeds toward the emission surface 209d. The laser light (i.e., the green light) from the semiconductor laser 203 is reflected by the prism surface 209b, passes through the prism surface 209a, and proceeds toward the emission surface 209d. The laser light (i.e., the red light) from the semiconductor laser 205 is reflected by the prism surface 209c, passes through the prism surfaces 209a and 209b, and proceeds toward the emission surface 209d. The laser light (i.e., the infrared light) from the semiconductor laser 207 passes through all of the prism surfaces 209a, 209b and 209c, and proceeds toward the emission surface 209d.

The laser light (i.e., the blue light, the green light, the red light and the infrared light) combined in the prism 209 is emitted from the emission surface 209d, and is incident on the prism 301.

The laser light incident on the prism 301 is reflected downward by the prism surface 301a. The laser light reflected by the prism surface 301a is emitted from the incident/emission surface 301c, passes through the ¼ wavelength plate 306, and is incident on the scanning mirror 101. Then, the laser light is reflected by the scanning mirror 101, passes through the ¼ wavelength plate 306 again, and is incident on the prism 301 through the incident/emission surface 301c.

The laser light incident on the prism 301 from the scanning mirror 101 proceeds upward (i.e., +Z direction) in the prism 301, passes through the prism surface 301a, and reaches the prism surface 301b. Only the infrared light is reflected by the prism surface 301b, and the infrared light proceeds toward the photodetector 302.

In contrast, the laser light (i.e., the blue light, the green light and the red light) having passed through the prism surface 301b is emitted from the emission surface 301d, and proceeds toward the screen (i.e., the projection surface).

Figure 8:
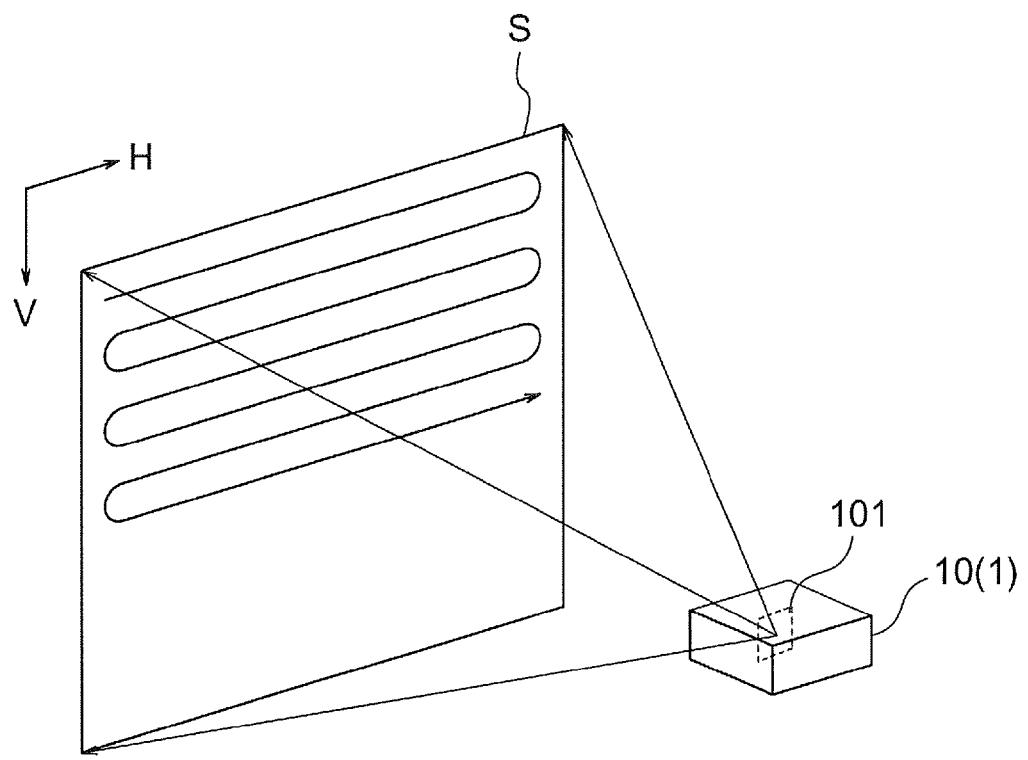
FIG. 8 is a schematic view for illustrating an optical scanning on a screen performed by the optical scanning device according to Embodiment 1 of the present invention.

As schematically shown in FIG. 8, when the above described horizontal scanning driving unit 100A, causes the scanning mirror 101 to rotate about the rotation axis in the Y direction, the laser light reflected by the scanning mirror 101 and emitted from the prism 301 moves in the horizontal direction of the screen S (i.e., the H direction: the main scanning direction) at a high speed. That is, the scanning in the horizontal direction is performed.

Further, when the above described vertical scanning driving unit 100B causes the scanning mirror 101 to rotate about the rotation axis in the X direction, the laser light reflected by the scanning mirror 101 and emitted from the prism 301 moves in the vertical direction of the screen S (i.e., the V direction: the sub-scanning direction) at a high speed. That is, the scanning in the vertical direction is performed.

Further, when the scanning mirror 101 rotates about the axis in the Y direction or the axis in the X direction, an incident position on the photodetector 302 (FIG. 7) also changes. Therefore, the angle information of the scanning mirror 101 about the axis in the Y direction and the axis in the X direction can be detected by the photodetector 302.

Figure 9:
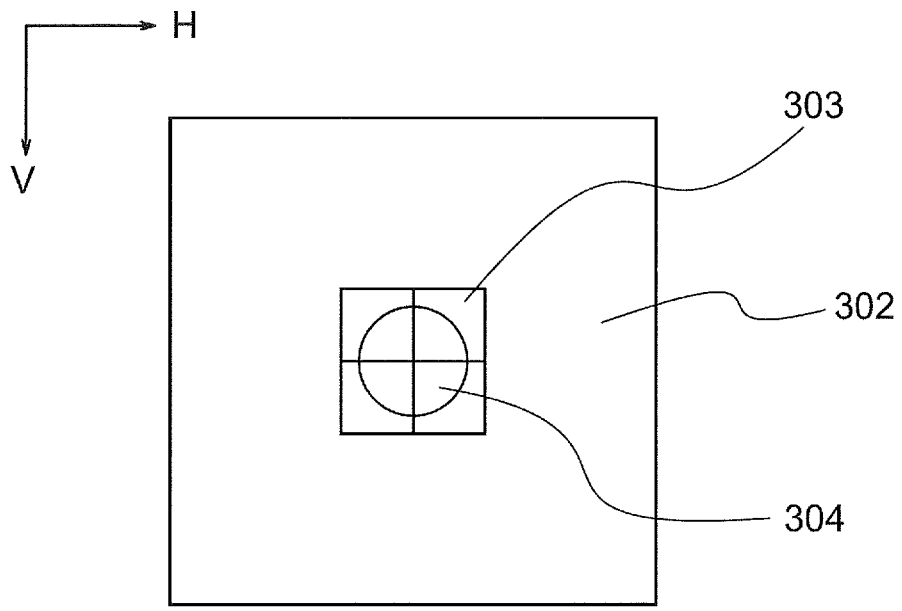
FIGS. 9(a) and 9(b) are schematic views showing configuration examples of a photodetector of the optical scanning device according to Embodiment 1 of the present invention.
Figure 9:
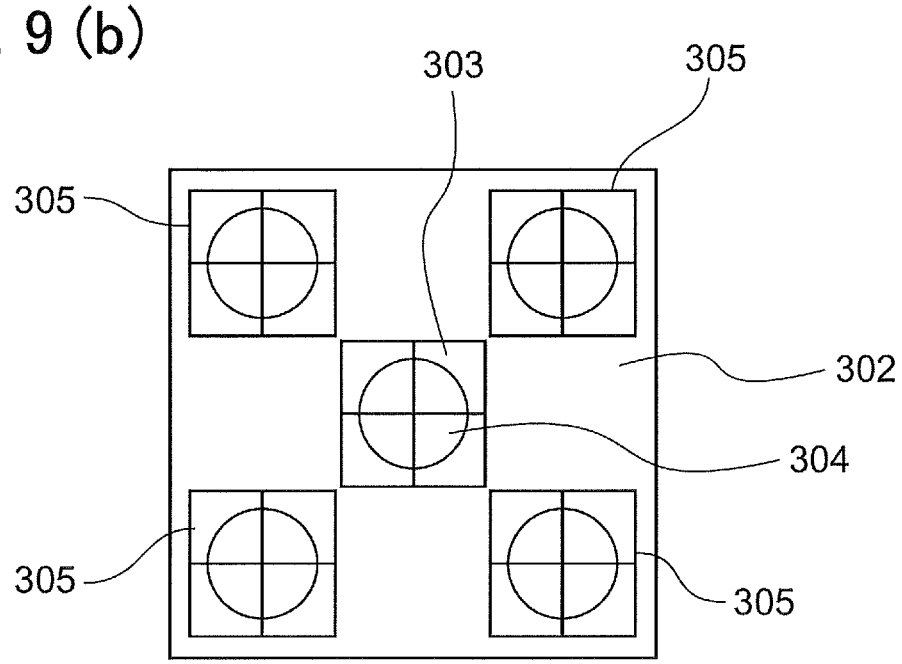

FIGS. 9(a) and 9(b) are a schematic view for illustrating an example of an operation of the photodetector 302. FIG. 9(a) shows a configuration example in which a quadrant optical detector 303 is provided at a center of an incident surface of the photodetector 302. FIG. 9(b) shows a configuration example in which quadrant optical detectors 305 are respectively provided at four corners of the incident surface, in addition to the quadrant optical detector 303 at the center of the incident surface of the photodetector 302.

In both of FIGS. 9(a) and 9(b), when the quadrant optical detector 303 is irradiated with laser light 304, an amount of irradiation light can be detected. Further, based on amounts of light in four areas divided by center lines in the horizontal direction and in the vertical direction, initial angle of the scanning mirror 101 in the horizontal direction and the vertical direction (i.e., rotating directions about the axis in the X direction and the axis in the Y direction) can be detected.

Therefore, for example, when the laser projector 1 is started, the initial angle of the scanning mirror 101 in the horizontal direction and in the vertical direction can be checked. Further, the initial angle of the scanning mirror 101 can be adjusted based on an output of the photodetector 302.

In this embodiment, as shown in FIG. 9(b), the quadrant optical detectors 305 are also provided at the four corners of the incident surface of the photodetector 302. The quadrant optical detectors 305 are located at four positions corresponding to both ends of a scanning range of the scanning mirror 101 in the horizontal direction and both ends of the scanning range in the vertical direction.

With such a configuration, scanning amplitudes of the scanning mirror 101 in the horizontal direction and the vertical direction can be controlled. That is, for example, when the scanning amplitude of the scanning mirror 101 in the horizontal direction is too large, it is possible to perform control such as reducing a current supplied to the horizontal scanning coil 111 by that amount.

Further, it also becomes possible to control timing of image displaying and correction of distortion. For example, a rectangular image signal (i.e., a reference image signal) as a reference is prepared. Currents supplied to the horizontal scanning coil 111 and the vertical scanning coils 105a and 105b are adjusted so that the laser light at four corners of a rectangle of the reference image signal can be detected at centers of the quadrant optical detectors 305 at the four corners of the photodetector 302. By displaying an image using the currents adjusted as described above, the timing of image displaying and the correction of distortion can be controlled.

Further, it is possible to measure sensitivity in scanning angles of the scanning mirror 101 (i.e., a scanning sensitivity) in the respective directions with respect to scanning driving signals in the horizontal direction and the vertical direction. Therefore, when there arises a variation in sensitivity due to a temperature change of the optical scanning device 10, it is possible to perform correction such as increasing or decreasing outputs of the semiconductor lasers 21, 23 and 25 by amounts corresponding to the variation.

<Assembly Method of Optical Scanning Device>

Next, an assembly method of the optical scanning device 10 according to the present invention will be described with reference to FIG. 2 and FIG. 6. The casing that houses the optical scanning device 10 can be made of material having, for example, a high rigidity, a dimension stability and a high heat dissipation. Such material is, for example, diecast aluminum or engineering plastic.

The frame structure 102 that constitutes a main part of the horizontal scanning driving unit 100A is formed into a shape having the base portions 102a and 102b, the beams 102c and 102d and the seat 102e as shown in FIG. 2 by, for example, machining metal or molding resin. The scanning mirror 101 in the form of a plate is fixed to the surface of the seat 102e, or the scanning mirror 101 is formed by coating the surface of the seat 102e with reflective material. The horizontal scanning magnet 110 as the thin magnet layer is fixed to a back surface of the seat 102e by bonding after adjusting a position and an angle of the horizontal scanning magnet 110.

The horizontal scanning coil 111 is fixed to a back surface of the supporting body 103 after adjusting a position and an angle of the horizontal scanning coil 111. The frame structure 102 is fixed to the supporting body 103 by bonding the base portions 102a and 102b of the frame structure 102 to the convex portions 103a and 103b preliminarily formed on the supporting body 103. In this way, the horizontal scanning driving unit 100A is assembled.

Regarding the vertical scanning driving unit 100B, the vertical scanning coils 105a and 105b are bonded to the surfaces 104e and 104f of the rotation holder 104 after adjusting positions and angles of the vertical scanning coils 105a and 105b. Further, the magnetic pieces 109a and 109b are fixed to the surfaces 104e and 104f of the rotation holder 104.

Further, the vertical scanning magnets 106a and 106b and the base 107 are bonded to predetermined positions in the casing of the optical scanning device 10 after adjusting positions and angles of the vertical scanning magnets 106a and 106b. Furthermore, the supporting shaft 108 of the base 107 is fitted into the shaft receiving portion 104h of the rotation holder 104. In this way, the vertical scanning driving unit 100B is assembled.

Furthermore, flexible printed sheets with electric wiring patterns for power supply are each connected to the horizontal scanning coil 111 and the vertical scanning coils 105a and 105b. The respective flexible printed sheets are fixed to predetermined positions in the casing of the optical scanning device 10 using screws after adjusting positions of the flexible printed sheets.

Next, the prism 209, the prism 301 and the collimator lenses 202, 204, 206 and 208 are bonded to predetermined positions in the casing of the optical scanning device 10 after adjusting positions and angles of the prism 209, the prism 301 and the collimator lenses 202, 204, 206 and 208.

Furthermore, the semiconductor lasers 201, 203, 205 and 207 and the photodetector 302 are preliminarily connected to flexible printed sheets with electric wiring patterns for power supply and signal transmission thereto, and are temporarily fixed to the casing of the optical scanning device 10. The "temporarily fixing" means fixing that allows later fine position adjustment.

Next, the respective flexible printed sheets are connected to a control device so that the scanning mirror 101 is made rotatable, the semiconductor lasers 201, 203, 205 and 207 are made capable of emitting light, and the photodetector 302 is made capable of receiving light. Then, positions of the temporarily fixed semiconductor lasers 201, 203, 205 and 207 and the photodetector 302 are finely adjusted.

To be more specific, the semiconductor laser 207 as the infrared laser light source is driven to emit the laser light having invisible wavelengths for sensing. The photodetector 302 is fixed after adjusting the position of the photodetector 302 so that the laser light is incident on a center of the quadrant optical detector 303.

Next, the semiconductor lasers 201, 203 and 205 are sequentially driven so as to emit the blue light, the green light and the red light. The semiconductor lasers 201, 203 and 205 are fixed after adjusting positions of the semiconductor lasers 201, 203 and 205 so that the laser light of the respective colors is incident on the center of the quadrant optical detector 303. In this way, the assembly of the optical scanning device 10 is completed.

Effects of Embodiment

As described above, according to the optical scanning device 10 of this embodiment, the frame structure 102 of the horizontal scanning driving unit 100A is only needed to have a rotating function in one direction (i.e., a rotating direction about the rotation axis in the Y direction). Therefore, the frame structure 102 is not needed to have rotating functions in two directions. Therefore, widths and thicknesses of the beams 102c and 102d can be sufficiently large, as compared with a configuration in which scanning is performed in two directions using deformation of beams. Therefore, resistance to shock or vibration can be enhanced.

Further, a machined-and-shaped metal article or a molded resin article may be used as the frame structure 102, and therefore it is not necessary to use MEMS technology. Therefore, expensive manufacturing equipment used in the MEMS technology becomes unnecessary, and a manufacturing cost can be reduced.

Furthermore, in the vertical scanning driving unit 100B, the rotation body including the rotation holder 104 is rotatably supported by the supporting shaft 108, and therefore is unlikely to be influenced by a temperature change. Therefore, as compared with a configuration in which scanning is performed in two directions using deformation of beams, a more stable rotation can be achieved.

Further, a horizontal scanning function and a vertical scanning function are separately provided by the horizontal scanning driving unit 100A including the frame structure 102, and the vertical scanning driving unit 100B including the rotation holder 104 and the supporting shaft 108. Therefore, the optical scanning device 10 can be assembled and disassembled easily, and therefore manufacturing yield can be enhanced.

Further, in the optical scanning device 10 of this embodiment, the vibration body (i.e., the scanning mirror 101, the frame structure 102 and the horizontal scanning magnet 110) has the natural vibration mode at the horizontal-direction-scanning driving frequency. Therefore, the current through the horizontal scanning coil 111 can be reduced by exciting the resonance of the vibration body. As a result, power consumption can be reduced, and a temperature rise can be reduced, so that a variation in the scanning sensitivity due to the temperature change can be suppressed.

Furthermore, in the optical scanning device 10 of this embodiment, the horizontal scanning magnet 110 as the thin magnet layer is provided on the back surface of the scanning mirror 101. The horizontal scanning magnet 110 is magnetized to have different magnetic poles across the rotation axis in the Y direction. Since such a thin magnetic layer is used, the moment of inertia of the vibration body about the rotation axis (i.e., the beams 102c and 102d) can be reduced, and the scanning mirror 101 can be rotated at a high speed.

In the optical scanning device 10 of this embodiment, the horizontal scanning coil 111 is provided at a position where the horizontal scanning coil 111 faces the horizontal scanning magnet 110 fixed to the scanning mirror 101. Therefore, heat generated by the current flowing through the horizontal scanning coil 111 is prevented from being directly transmitted to the scanning mirror 101. As a result, distortion of the reflection surface of the scanning mirror 101 due to a temperature rise can be suppressed, and therefore distortion or blurring of a projected image can be suppressed.

Furthermore, in the optical scanning device 10 of this embodiment, the rotation body (i.e., the horizontal scanning driving unit 100A, the rotation holder 104, the vertical scanning coil 105a and 105b and the magnetic pieces 109a and 109b) has the resonant frequency equal to the vertical-direction-scanning driving frequency. Therefore, by exciting the resonance of the rotation body, the current through the vertical scanning coils 105a and 105b can be reduced. As a result, power consumption can be reduced, and a temperature rise can be reduced, so that a variation in the scanning sensitivity due to the temperature change can be suppressed.

Further, in the optical scanning device 10 of this embodiment, the rotation body including the rotation holder 104 is rotatably supported by fitting the supporting shaft 108 fixed to the base 107 into the shaft receiving portion 104h of the rotation holder 104. Therefore, by fitting the supporting shaft 108 into the shaft receiving portion 104h with a high accuracy, a vibration of the scanning mirror 101 due to vibration or shock from outside can be suppressed.

Furthermore, the optical scanning device 10 of this embodiment uses the magnetic spring force using the attraction forces between the magnetic pieces 109a and 109b provided on the rotation holder 104 and the magnets 106a and 106b. With such a configuration, it becomes possible to achieve the operation of the scanning mirror 101 which is less likely to be influenced by a temperature change, vibration or shock.

Furthermore, in the optical scanning device 10 according to this embodiment, the photodetector 302 receives a part of the laser light (i.e., a scanning light flux) emitted by the scanning mirror 101, and the quadrant optical detectors 303 and 305 are provided at the center and the four corners of the photodetector 302. With such a configuration, the initial angles and the scanning sensitivity of the scanning mirror 101 in the horizontal direction and the vertical direction can be detected, and therefore it becomes possible to control the correction of distortion of a projected image.

<Application Example of Laser Projector Using Optical Scanning Device>

Figure 10:
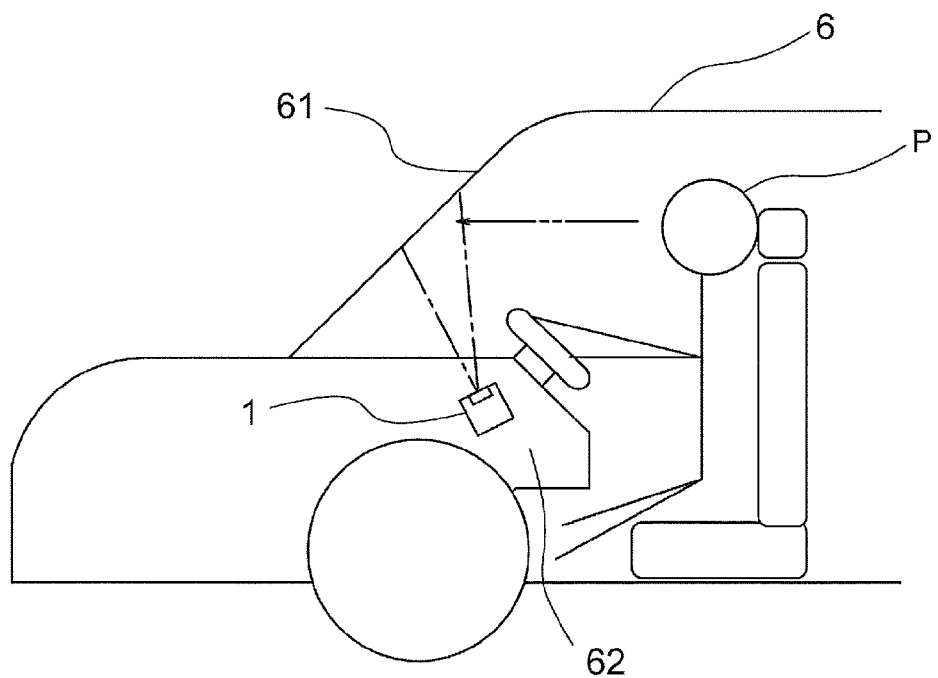
FIG. 10 is a view showing an example of a head up display applying a projector using the optical scanning device according to Embodiment 1 of the present invention.

FIG. 10 is a view showing an example in which the laser projector 1 using the optical scanning device 10 of this embodiment is used in a vehicle, more specifically, applied to a head-up display.

The laser projector 1 of this embodiment is mounted to, for example, a dashboard 62 of a vehicle 6 such as an automobile. The laser projector 1 projects an image toward a front windshield 61, and forms a virtual image. A driver P is able to visually recognize a projected image (for example, navigation information) through the front windshield 61, while observing a front of the vehicle 6.

Projectors of vehicles are likely to be influenced by a temperature change and an external force such as shock and vibration. However, the optical scanning device 10 of this embodiment is configured so that the horizontal scanning driving unit 100A including the frame structure 102 performs scanning in the horizontal direction, and the vertical scanning driving unit 100B including the supporting shaft 108 and the rotation holder 104 performs scanning in the vertical direction. With such a configuration, the optical scanning device 10 of this embodiment has a high resistance to shock and vibration, and is less likely to be influenced by a temperature change as described above. Therefore, the laser projector 1 can project an excellent image even in the case where the laser projector 1 is used in the vehicle as described above.

The laser projector 1 using the optical scanning device 10 of this embodiment is not limited to the use shown in FIG. 10, but can be used as, for example, a compact portable projector.

In this regard, the present invention is not limited to the above described embodiment, but may be appropriately modified. For example, positions and winding patterns of the horizontal scanning coil 111 and the vertical scanning coils 105a and 105b are not limited to the above described specific examples. It is only necessary that the horizontal scanning coil 111 and the vertical scanning coils 105a and 105b generate electromagnetic forces that causes the scanning mirror 101 to rotate about the rotation axis in the Y direction and causes the rotation holder 104 to rotate about the rotation axis in the X direction. The same can be said to positions and winding patterns of the horizontal scanning magnet 110 and the vertical scanning magnets 106a and 106b.

Further, in the above described embodiment, the semiconductor lasers 201, 203 and 205 emitting the red light, the green light and the blue light are used as the display light sources. However, the present invention is not limited to this combination. For example, the display laser light source may be configured to emit monochromatic light. Further, for example, an LED (Light Emitting Diode) may be used instead of the laser light source. Therefore, the projector of the present invention may be a projector other than the laser projector.

EXPLANATION OF REFERENCE CHARACTERS

1 . . . optical scanning device, 10 . . . two-dimensional optical scanning unit, 100A . . . horizontal scanning driving unit (first scanning driving unit), 100B . . . vertical scanning driving unit (second scanning driving unit), 101 . . . scanning mirror, 102 . . . frame structure, 102a, 102b . . . base portion, 102c, 102d . . . beam, 103 . . . supporting body, 104 . . . rotation holder, 105a, 105b . . . vertical scanning coil (second coil), 106a, 106b . . . vertical scanning magnet (second magnet), 107 . . . base, 108 . . . supporting shaft, 109a, 109b . . . magnetic piece, 110 . . . horizontal scanning magnet (first magnet), 111 . . . horizontal scanning coil (first coil), 200 . . . light source unit, 201, 203, 205 . . . semiconductor laser, 202, 204, 206, 207 . . . collimator lens, 207 . . . semiconductor laser, 208 . . . collimator lens, 209 . . . prism (incident-side optical element), 301 . . . prism (emission-side optical element), 302 . . . photodetector (optical detector), 303, 305 . . . quadrant optical detector, 306 . . . ¼ wavelength plate.

What is claimed is:

1. An optical scanning device comprising:
a first scanning driving unit including a scanning mirror, and a frame structure supporting the scanning mirror, the first scanning driving unit being configured to cause the scanning mirror to rotate about a first rotation axis by means of deformation of the frame structure;
a second scanning driving unit including a rotation holder supporting the first scanning driving unit, and a supporting shaft that rotatably supports the rotation holder about a second rotation axis perpendicular to the first rotation axis, the second scanning driving unit being configured to cause the rotation holder to rotate about the second rotation axis;
a light source that emits light;
an incident-side optical element that guides the light emitted by the light source to the scanning mirror;
an emission-side optical element that guides reflected light reflected by the scanning mirror to a projection surface, and
a photodetector mounted to the emission-side optical element, the photodetector detecting a part of the reflected light,
wherein the photodetector includes quadrant optical detectors provided at a center of an incident surface and a plurality of positions corresponding to both ends of the incident surface in a direction of scanning by the first scanning driving unit and both ends of the incident surface in a direction of scanning by the second scanning driving unit.

2. The optical scanning device according to claim 1, wherein the quadrant optical detectors are provided at five positions.

3. The optical scanning device according to claim 1, wherein the frame structure includes a pair of beams provided so as to sandwich the scanning mirror in a direction of the first rotation axis, and a pair of base portions provided on sides of respective beams of the pair of beams opposite to the scanning mirror, and
wherein each of the pair of base portions has an elongated shape elongated in a direction of the second rotation axis, and is deformable.

4. A projector comprising the optical scanning device according to claim 1.

5. The projector according to claim 4, wherein the optical scanning device is provided so as to project an image on a windshield of a vehicle.

* * * * *